United States Patent
Bonnet et al.

(10) Patent No.: US 10,787,169 B2
(45) Date of Patent: Sep. 29, 2020

(54) METHOD AND DEVICE FOR SAFEGUARDING A MOVEMENT OF A MOTOR VEHICLE ON AN INCLINED RAMP

(71) Applicant: Robert Bosch GmbH, Stuttgart (DE)

(72) Inventors: Christophe Bonnet, Leinfelden-Echterdingen (DE); Gerrit Quast, Nuertingen (DE); Martin Moser, Fellbach (DE); Roland Schweiger, Neu-Ulm (DE); Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 332 days.

(21) Appl. No.: 15/776,345

(22) PCT Filed: Sep. 16, 2016

(86) PCT No.: PCT/EP2016/071957
§ 371 (c)(1),
(2) Date: May 15, 2018

(87) PCT Pub. No.: WO2017/084786
PCT Pub. Date: May 26, 2017

(65) Prior Publication Data
US 2020/0255000 A1    Aug. 13, 2020

(30) Foreign Application Priority Data
Nov. 20, 2015 (DE) .......... 10 2015 222 930

(51) Int. Cl.
*G08G 1/16* (2006.01)
*B60W 30/06* (2006.01)
(Continued)

(52) U.S. Cl.
CPC .......... *B60W 30/085* (2013.01); *B60W 30/06* (2013.01); *B60W 30/09* (2013.01); *B60W 60/0011* (2020.02); *B60W 60/0015* (2020.02)

(58) Field of Classification Search
CPC . G08G 1/16; G08G 1/09; E01F 13/12; B60W 30/06; B60W 30/09; B60W 30/085; B60W 60/0015; B60W 60/0011
(Continued)

(56) References Cited

U.S. PATENT DOCUMENTS 4,320,380 A * 3/1982 Berard ................ E01F 13/06
340/935
6,312,188 B1 * 11/2001 Ousterhout .......... E01F 13/024
256/1
(Continued)

FOREIGN PATENT DOCUMENTS

CN   2122235 U   11/1992
CN   201494468 U   6/2010
(Continued)

OTHER PUBLICATIONS

International Search Report for PCT/EP2016/071957, dated Jan. 4, 2017.

*Primary Examiner* — Tan Q Nguyen
(74) *Attorney, Agent, or Firm* — Norton Rose Fulbright US LLP; Gerard Messina

(57) ABSTRACT

A method for safeguarding a movement of a motor vehicle on an inclined ramp. Downhill from the motor vehicle, one or multiple collision object(s) is/are moved into a travel path specified by the ramp, so that in the event of a downhill movement of the motor vehicle on the travel path, a collision of the one or multiple collision object(s) with the motor vehicle reduces a speed of the motor vehicle while it is still
(Continued)

on the ramp. Also described are a corresponding device, a parking facility, and a computer program.

18 Claims, 2 Drawing Sheets

(51) Int. Cl.
  *B60W 30/085* (2012.01)
  *B60W 30/09* (2012.01)
  *B60W 60/00* (2020.01)

(58) Field of Classification Search
  USPC .......................................................... 701/301
  See application file for complete search history.

(56) References Cited

U.S. PATENT DOCUMENTS

| | | | | |
|---|---|---|---|---|
| 6,997,638 B2* | 2/2006 | Hensley | ................ | E01F 13/046 |
| | | | | 404/6 |
| 7,249,909 B2* | 7/2007 | Bibber | .................... | E01F 13/12 |
| | | | | 404/6 |
| 7,950,870 B1* | 5/2011 | Thompson | .............. | E01F 13/12 |
| | | | | 256/13.1 |
| 8,382,391 B1* | 2/2013 | Potter | ..................... | E01F 13/12 |
| | | | | 404/6 |
| 10,184,287 B2* | 1/2019 | Tehranchi | ............... | E05F 15/70 |
| 2005/0220536 A1* | 10/2005 | Blair | ....................... | E01F 13/08 |
| | | | | 404/6 |
| 2006/0045618 A1 | 3/2006 | Bibber | | |
| 2015/0146001 A1 | 5/2015 | White | | |

FOREIGN PATENT DOCUMENTS

| | | |
|---|---|---|
| CN | 202574259 U | 12/2012 |
| CN | 103241266 A | 8/2013 |
| DE | 1100064 B | 2/1961 |
| DE | 1684756 A1 | 3/1971 |
| DE | 102012212090 A1 | 1/2014 |
| DE | 102012217704 A1 | 6/2014 |
| EP | 0816599 A2 | 1/1998 |
| FR | 2891851 A3 | 4/2007 |
| WO | 0179627 A1 | 10/2001 |

\* cited by examiner

METHOD AND DEVICE FOR SAFEGUARDING A MOVEMENT OF A MOTOR VEHICLE ON AN INCLINED RAMP

FIELD OF THE INVENTION

The present invention relates to a method and a device for safeguarding a movement of a motor vehicle on an inclined ramp. Moreover, the present invention relates to a parking facility and a computer program.

BACKGROUND INFORMATION

Published Unexamined German Patent Application DE 10 2012 222 562 A1 provides a system for managed parking lots for transferring a vehicle from a start position to a target position.

In fully automated (autonomous) so-called valet parking, a vehicle is parked by its driver at a drop-off point, for example in front of a parking deck, and from there the vehicle drives itself into a parking position/parking space and back to the drop-off point.

Parking garages generally include multiple levels that are connected to one another via ramps. If, for example, a braking system of a vehicle fails when it is driving on the ramp, there is a risk that the vehicle may uncontrollably descend the ramp and possibly collide with objects, for example persons, walls, pillars, or other vehicles.

SUMMARY OF THE INVENTION

An object underlying the present invention is regarded as providing an efficient concept for efficiently safeguarding a movement of a motor vehicle on an inclined ramp.

This object may be achieved by the respective subject matter of the descriptions herein. Advantageous embodiments of the present invention are the subject matter of the further descriptions herein.

According to one aspect, a method for safeguarding a movement of a motor vehicle on an inclined ramp is provided; downhill from the motor vehicle, one or multiple collision object(s) is/are moved into a travel path specified by the ramp, so that in the event of a downhill movement of the motor vehicle on the travel path, a collision of the one or multiple collision object(s) with the motor vehicle reduces a speed of the motor vehicle while it is still on the ramp.

According to another aspect, a device for safeguarding a movement of a motor vehicle on an inclined ramp is provided, including one or multiple collision object(s) and a movement device for moving the or the multiple collision object(s) into a travel path specified by the ramp, downhill from the motor vehicle, so that in the event of a downhill movement of the motor vehicle on the travel path, a collision of the one or multiple collision object(s) with the motor vehicle may reduce a speed of the motor vehicle while it is still on the ramp.

According to another aspect, a parking facility is provided which includes an inclined ramp and the device for safeguarding a movement of a motor vehicle on an inclined ramp.

According to another aspect, a computer program is provided which includes program code for carrying out the method for safeguarding a movement of a motor vehicle on an inclined ramp when the computer program is executed on a computer, in particular on the device for safeguarding a movement of a motor vehicle on an inclined ramp.

The present invention also encompasses in particular, among other things, the concept of providing one or multiple collision object(s) that is/are moved into a travel path of a motor vehicle that is situated on an inclined ramp, so that the collision object(s) collide(s) with the motor vehicle when the motor vehicle descends the ramp or moves down the ramp. Due to the collision, at least a portion of the kinetic energy, in particular all of the kinetic energy, of the motor vehicle is converted into other forms of energy, for example potential energy and/or thermal energy, so that a speed reduction may be effectuated. In particular, the collision causes a momentum of the motor vehicle after the collision to become smaller or less than that prior to the collision. Since it is assumed here that the mass of the motor vehicle will undergo little or no change due to the collision, a speed reduction is effectuated via the momentum reduction. Thus, a collision object is for the surroundings of the ramp, such as a "cowcatcher," also referred to as a bull bar, mounted on a motor vehicle.

This yields in particular the technical advantage that a speed of the motor vehicle may be efficiently reduced when the motor vehicle is still on the ramp. Thus, if the motor vehicle leaves the ramp after the speed has been reduced according to the present invention due to a collision, it will do this at a reduced speed, so that a possible additional collision with other objects, for example other motor vehicles, persons, or infrastructure elements such as walls or pillars, would take place at a lower speed. For example, the severity of an accident may be reduced in this way.

If it is still possible for the motor vehicle to be stopped on the ramp, i.e., for the speed to be reduced to 0 m/s, the motor vehicle will not leave the ramp at all, and in this regard also will not pose a risk for objects situated in the surroundings of the ramp, but outside the ramp.

On the whole, this may yield in particular the technical advantage that a movement of the motor vehicle on an inclined ramp may be efficiently safeguarded, in particular due to reducing the speed of the motor vehicle.

Due to it being possible on account of the collision to reduce the speed of the motor vehicle while it is still on the ramp, this yields in particular the technical advantage that, for example, if a braking system of the motor vehicle fails, the motor vehicle may still be braked. In particular, for example a motor vehicle which, unattended by its user, has moved forward and onto the ramp because the user, for example, has not secured or activated the parking brake, may be efficiently braked with the aid of the collision.

A reduction of the speed of the motor vehicle includes in particular a reduction to 0 m/s, i.e., stopping the motor vehicle.

Within the meaning of the present invention, an inclined ramp refers in particular to a ramp that connects two levels to one another which are spaced apart, in particular at different heights relative to a reference point. The levels are, for example, floors of a parking facility. The reference point is the ground, for example.

The inclined ramp thus forms an inclined plane, and may be referred to as such.

According to one specific embodiment, this means that the ramp connects a first floor of a parking facility to a second floor of the parking facility.

"Downhill from the motor vehicle" refers in particular to the area of the ramp situated in the downhill direction relative to the motor vehicle.

The movement of the motor vehicle includes in particular driverless travel of the motor vehicle. This means that the motor vehicle travels on the inclined ramp in a driverless manner within the scope of the movement. Such driverless travel of the motor vehicle includes in particular that the motor vehicle is remote-controlled, or that the motor vehicle travels autonomously, i.e., by itself. For example, it is provided that the motor vehicle travels down one portion of the ramp autonomously, and travels down another portion of the ramp by remote control.

According to one specific embodiment, it is provided that the or the multiple collision object(s) include(s) one or multiple elements selected from the following group of collision objects: barrier, pillar, safety net, restraint cable.

The above-described examples of possible collision objects, as used within the scope of the present invention, are particularly suitable objects (for example due to their size and/or their material) for bringing about or effectuating a collision with the motor vehicle. Thus, for example, a barrier is generally wide enough to cover the entire travel path, so that the motor vehicle during its downhill movement will in any event collide with the barrier. Pillars are generally solid infrastructure elements, so that they may effectuate an efficient speed reduction during a collision. A safety net and a restraint cable are a particularly efficient arrangement for reducing a speed of a motor vehicle while it is still on the ramp. In particular, these arrangement may advantageously reduce the speed without at the same time generating a comparable damage on the motor vehicle in contrast to a barrier or a pillar. In addition, safety nets or restraint cables may be efficiently stowed before they are put into use.

According to one specific embodiment, it is provided that the barrier is moved into the travel path from above, from below, or from the side.

This yields in particular the technical advantage that the barrier may be efficiently moved into the travel path as a function of the specific case in question. Thus, structural constraints or criteria may advantageously be taken into account.

According to one specific embodiment, it is provided that the pillar is moved from a floor into the travel path.

This means that the pillar is, for example, countersunk in the floor, and is moved from the floor into the travel path only for the collision. This means that the pillar normally does not represent an obstacle for motor vehicles traveling on the ramp.

According to one specific embodiment, it is provided that the or the multiple collision object(s) is/are moved into the travel path from above, from below, or from the side.

According to one specific embodiment, it is provided that the or the multiple collision object(s) is/are moved out of a floor into the travel path.

The floor is, for example, the floor of the ramp, in which case the floor may then also be referred to as a driving surface.

The floor is, for example, a floor of an area directly adjoining the ramp, for example a threshold in front of the ramp.

According to one specific embodiment, for multiple collision objects it is provided that these are moved into the travel path from above and/or from below and/or from the side and/or out of a floor.

According to one specific embodiment, it is provided that an activation signal, emitted from the motor vehicle, for activating a movement device for moving the or the multiple collision object(s) into the travel path of the motor vehicle is received via a communication network, the movement device being activated in response to the received activation signal in order to move the or the multiple collision object(s) into the travel path.

This yields in particular the technical advantage that it may be efficiently ensured that the collision objects are also moved into the travel path at the right time. This is due to the fact that in the present case, the motor vehicle itself triggers the movement of the collision objects via the activation of the movement device. The motor vehicle, due to internal diagnostics of the individual motor vehicle systems, generally has the best knowledge concerning whether a speed reduction via a collision with one or multiple collision object(s) is necessary. This is necessary, for example, when a braking system and/or a vehicle electrical system and/or one or multiple components of the electrical system of the motor vehicle has/have failed. In that case, a collision for reducing the speed while the motor vehicle is still on the ramp is the "lesser evil" compared to the case in which the motor vehicle, for example unbraked, would collide with other objects after leaving the ramp.

According to one specific embodiment, it is provided that an error message emitted from the motor vehicle is received via a communication network, the or the multiple collision object(s) being moved into the travel path in response to the received error message.

This yields in particular the technical advantage that a response to an error that has occurred during operation of the motor vehicle may be efficiently made in order to prevent a collision of the motor vehicle with other objects. In particular, it may thus advantageously be ensured that the collision objects are moved into the travel path only when necessary.

According to one specific embodiment, a communication network includes a WLAN communication network and/or a mobile communications network and/or a communication network according to the low-power wide-range communication (LoRa) standard.

According to one specific embodiment, in each case a communication via the communication network is encrypted.

According to one specific embodiment, it is provided that after the or the multiple collision object(s) move(s) into the travel path, the or the multiple collision object(s) is/are not moved once again out of the travel path in order to open up the travel path until a check has shown that an uncontrolled downhill movement of the motor vehicle on the travel path may be ruled out.

This yields in particular the technical advantage that safety may be efficiently increased even more, in this regard only as a function of whether an error message or an activation signal is present indicating that multiple collision objects are already situated in the travel path. According to this specific embodiment, the travel path is not opened up once again until a check has shown that an uncontrolled downhill movement of the motor vehicle on the travel path may be ruled out.

An uncontrolled downhill movement of the motor vehicle refers in particular to an unbraked downhill movement of the motor vehicle on the travel path. "Uncontrolled" means in particular that the motor vehicle has a speed, for example, that is higher than a predetermined speed threshold value.

According to one specific embodiment, it is provided that the check includes making a check as to whether the motor vehicle is stopped in front of the or the multiple collision object(s), an uncontrolled downhill movement of the motor vehicle being ruled out when the check has shown that the motor vehicle is stopped in front of the or the multiple collision object(s).

This yields in particular the technical advantage that it may be efficiently determined whether or not an uncontrolled downhill movement is present. This is achieved via the criterion of whether or not the motor vehicle has stopped in front of the or the multiple collision object(s). If the motor vehicle has stopped in front of the collision objects at the right time, it carries out a controlled movement, provided that it is still stopped at the right time.

If the collision objects are stated in the plural within the scope of the present description, this is always to be construed as the singular, and vice versa.

Within the meaning of the present invention, vehicles are motor vehicles.

According to one specific embodiment, it is provided that a movement of the motor vehicle on the ramp is monitored with the aid of a monitoring device, the or the multiple collision object(s) being moved into the travel path as a function of the monitoring.

This yields in particular the technical advantage that it may be efficiently decided whether or not the objects are to be moved into the travel path. This is based on the monitoring carried out with the aid of the monitoring device.

Within the meaning of the present invention, according to one specific embodiment a monitoring device includes one or multiple surroundings sensors. A surroundings sensor is, for example, one of the following surroundings sensors: radar sensor, LIDAR sensor, laser sensor, video sensor, ultrasonic sensor, magnetic sensor, photoelectric barrier sensor, and infrared sensor.

Within the meaning of the present invention, a monitoring device is in particular provided separately from the motor vehicle; i.e., the monitoring device is in particular a monitoring device external to the motor vehicle. The monitoring device is situated, for example, within a parking facility on infrastructure elements of the parking facility.

The monitoring device thus detects the motor vehicle, for example, and based on the monitoring, ascertains corresponding monitoring data. If the monitoring device includes one or multiple surroundings sensors, surroundings data corresponding to the monitoring are thus ascertained. According to one specific embodiment, the monitoring data, i.e., the surroundings data in particular, are analyzed for an uncontrolled downhill movement of the motor vehicle. For example, a speed of the motor vehicle is ascertained, based on the monitoring data. If the speed of the motor vehicle should be above a predetermined speed threshold value, the collision objects are moved into the travel path.

The analysis of the monitoring data includes, for example, a prediction of a movement of the motor vehicle. Based on the prediction, a decision is then made as to whether or not the collision objects should be moved into the travel path.

According to one specific embodiment, it is provided that the device for safeguarding a movement of a motor vehicle on an inclined ramp is configured or configured for executing or carrying out the method for safeguarding a movement of a motor vehicle on an inclined ramp.

According to one specific embodiment, the method for safeguarding a movement of a motor vehicle on an inclined ramp is executed or carried out with the aid of the device for safeguarding a movement of a motor vehicle on an inclined ramp.

Technical functionalities of the device result from corresponding technical functionalities of the method, and vice versa.

According to one specific embodiment of the device, it is provided that the or the multiple collision object(s) include(s) one or multiple elements selected from the following group of collision objects: barrier, pillar, safety net, restraint cable.

According to one specific embodiment, it is provided that the movement device is configured for moving the barrier from above, from below, or from the side into the travel path.

According to another specific embodiment, it is provided that the movement device is configured for moving the pillar out of a floor into the travel path.

According to another specific embodiment, it is provided that a communication interface is provided which is configured for receiving an activation signal, emitted from the motor vehicle, for activating the movement device for moving the or the multiple collision object(s) into the travel path of the motor vehicle, via a communication network, the movement device being configured for moving the or the multiple collision object(s) into the travel path in response to the received activation signal.

According to yet another specific embodiment, it is provided that a communication interface is provided which is configured for receiving an error message, emitted from the motor vehicle, via a communication network, the movement device being configured for moving the or the multiple collision object(s) into the travel path in response to the received error message.

According to another specific embodiment, it is provided that a checking device is provided which is configured for checking whether an uncontrolled downhill movement of the motor vehicle on the travel path may be ruled out, the movement device, after the movement of the or the multiple collision object(s) into the travel path, being configured for once again moving the or the multiple collision object(s) out of the travel path in order to open up the travel path only when the check has shown that an uncontrolled downhill movement of the motor vehicle on the travel path may be ruled out.

According to another specific embodiment, it is provided that the checking device is configured for checking whether the motor vehicle is stopped in front of the or the multiple collision object(s), the checking device being configured for ruling out an uncontrolled downhill movement of the motor vehicle on the travel path when the check has shown that the motor vehicle is stopped in front of the or the multiple collision object(s).

According to another specific embodiment, it is provided that a monitoring device is provided which is configured for monitoring a movement of the motor vehicle on the ramp, the movement device being configured for moving the or the multiple object(s) into the travel path as a function of the monitoring.

According to one specific embodiment, it is provided that a movement device is provided which is configured for moving the or the multiple collision object(s) into the travel path.

According to one specific embodiment, a monitoring device is provided which is configured for monitoring a movement of the motor vehicle on the ramp.

According to one specific embodiment, the device includes a monitoring device.

According to one specific embodiment, the parking facility includes a monitoring device.

The monitoring device of the parking facility or of the device is the above-described monitoring device, for example.

Within the meaning of the present invention, a parking facility is referred to in particular as a parking lot, and is used as a parking area for vehicles. The parking facility thus forms in particular a contiguous area that includes multiple parking spaces (for a parking facility on private property), or parking positions (for a parking facility on public property).

According to one specific embodiment, the parking facility is configured as a parking deck. According to one specific embodiment, the parking facility is configured as a parking garage.

According to one specific embodiment, the parking facility includes multiple floors, in each case connected via an inclined ramp. Within the meaning of the present invention, a ramp may also be referred to as an inclined plane.

According to one specific embodiment, a control device is provided which is configured for controlling the movement device. This means that the control device is configured for controlling the movement device in such a way that the latter moves the or the multiple collision object(s) into the travel path.

According to one specific embodiment, the movement device includes a motor, for example a drive motor, for example for moving a collision object into the travel path. For example, a motor drives a barrier or a movably situated pillar in such a way that it is moved or may be moved in each case into the travel path.

For example, a movement of a safety net or a restraint cable into the travel path includes the safety net or the restraint cable being stretched out in such a way that the stretched-out safety net or the stretched-out restraint cable is situated in the travel path.

The movement of the barrier into the travel path includes in particular a pivoting of the barrier in such a way that it is pivoted into the travel path.

The movement of the pillar includes in particular that it undergoes a translatory movement into the travel path.

The present invention is explained in greater detail below with reference to the exemplary embodiments.

DETAILED DESCRIPTION

Figure 1:
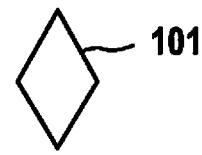
FIG. 1 shows a flow chart of a method for safeguarding a movement of a motor vehicle on an inclined ramp.

FIG. 1 shows a flow chart of a method for safeguarding a movement of a motor vehicle on an inclined ramp.

Downhill from the motor vehicle, one or multiple collision object(s) is/are moved into a travel path specified by the ramp according to a step 101, so that in the event of a downhill movement of the motor vehicle on the travel path, a collision of the one or multiple collision object(s) with the motor vehicle reduces a speed of the motor vehicle while it is still on the ramp.

Figure 2:
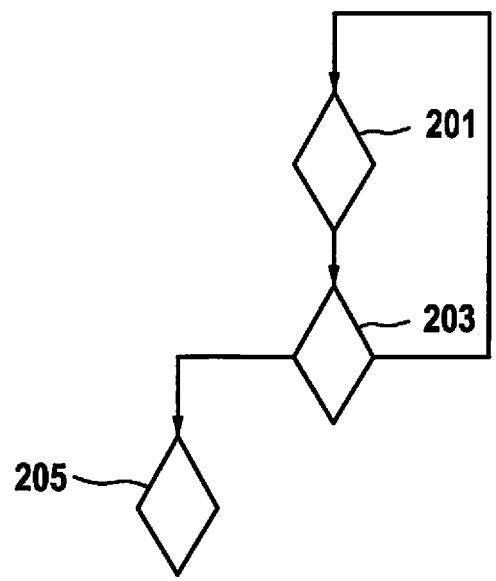
FIG. 2 shows a flow chart of another method for safeguarding a movement of a motor vehicle on an inclined ramp.

FIG. 2 shows a flow chart of another method for safeguarding a movement of a motor vehicle on an inclined ramp.

Travel of the motor vehicle on the inclined ramp is monitored with the aid of a monitoring device in a step 201 in order to ascertain monitoring data corresponding to the monitoring. The ascertained monitoring data are analyzed in a step 203 to decide or to determine whether one or multiple collision object(s) must be moved into a travel path specified by the ramp, so that in the event of a downhill movement of the motor vehicle on the travel path, a collision of the one or multiple collision object(s) with the motor vehicle reduces a speed of the motor vehicle while it is still on the ramp.

For example, a prediction of a movement of the motor vehicle on the ramp is provided in step 203. For example, it is provided in step 203 that an instantaneous motor vehicle speed is ascertained and compared to a predefined speed threshold value. If the ascertained instantaneous motor vehicle speed is higher than the speed threshold value, it is decided that one or multiple collision object(s) must be moved into the travel path.

The method is continued in step 205 if a decision or determination has been made in step 203 that one or multiple collision object(s) must be moved into the travel path. This means that one or multiple collision object(s) is/are moved into the travel path in step 205.

The movement according to step 205 includes, for example, closing a barrier. The movement in step 205 includes, for example, moving a pillar out of a floor, for example a floor of the ramp, into the travel path. For example, the movement in step 205 includes stretching out a safety net or a restraint cable in order to intercept the motor vehicle.

If a decision or determination has been made in step 203 that a collision object does not have to be moved into the travel path, the method is continued with step 201. The method is continuously repeated, for example, until the motor vehicle has left the ramp.

Figure 3:
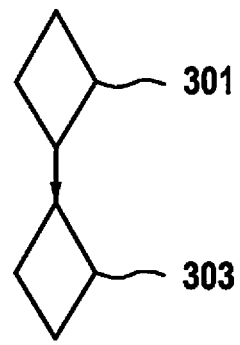
FIG. 3 shows a flow chart of another method for safeguarding a movement of a motor vehicle on an inclined ramp.

FIG. 3 shows a flow chart of another method for safeguarding a movement of a motor vehicle on an inclined ramp.

An error message emitted from the motor vehicle is received via a communication network in a step 301. The error message states, for example, that a braking system of the motor vehicle has failed or has a malfunction. The error message states, for example, that an electrical system of the motor vehicle has failed or has a malfunction.

In response to the received error message, in each case one or multiple collision object(s) is/are moved into the travel path specified by the ramp according to a step 303, so that in the event of a downhill movement of the motor vehicle on the travel path, a collision of the one or multiple collision object(s) with the motor vehicle reduces a speed of the motor vehicle while it is still on the ramp.

Figure 4:
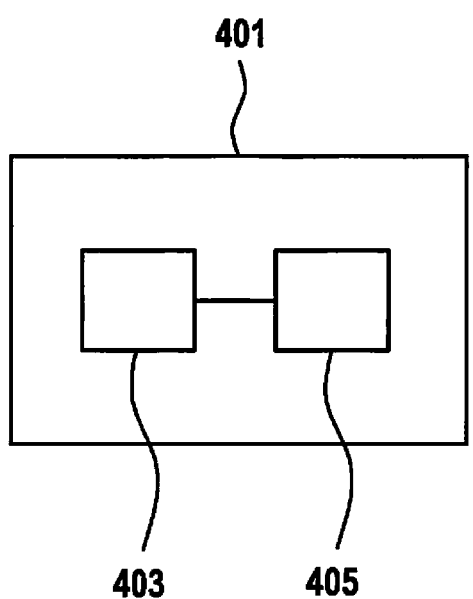
FIG. 4 shows a device for safeguarding a movement of a motor vehicle on an inclined ramp.

FIG. 4 shows a device 401 for safeguarding a movement of a motor vehicle on an inclined ramp, in schematic form.

Device 401 includes a collision object 403. In one specific embodiment not shown, multiple collision objects 403 are provided. These may have identical or different designs.

Device 401 also includes a movement device 405 that is configured for moving collision object 403 into a travel path specified by the ramp, downhill from the motor vehicle, so that in the event of a downhill movement of the motor vehicle on the travel path, a collision of collision object 403 with the motor vehicle reduces a speed of the motor vehicle while it is still on the ramp.

Movement device 405 includes, for example, a drive motor for driving or moving a barrier or a pillar. Device 401 includes, for example, a control device for controlling movement device 405, in particular for controlling the drive motor.

Device 401 includes, for example, a communication interface for receiving an error message or an activation signal via a communication network.

Figure 5:
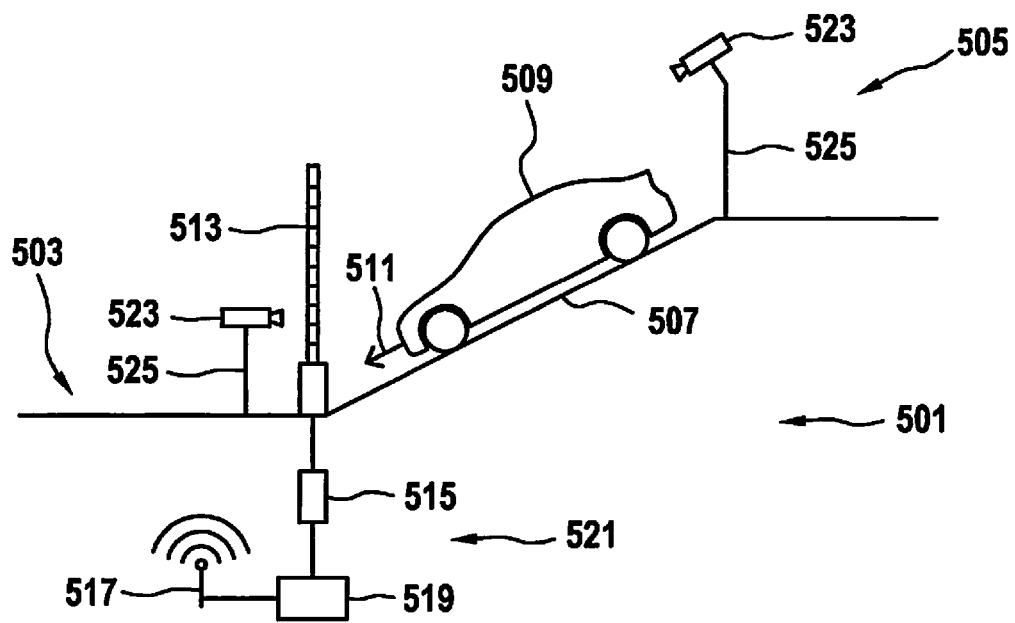
FIG. 5 shows a parking facility.

FIG. 5 shows a parking facility 501.

Parking facility 501 includes a first floor 503, and a second floor 505 situated above first floor 503. An inclined ramp 507, also referred to as an inclined plane, connects the two floors 503, 505.

A motor vehicle 509 travels from second floor 505 to first floor 503 via ramp 507. Motor vehicle 509 is still situated on ramp 507. A travel direction of motor vehicle 509 is denoted by the arrow with reference numeral 511. Travel direction 511 is specified in particular by ramp 507, which in this regard establishes a travel path for motor vehicle 509.

Downhill from motor vehicle 509, a barrier 513 is provided which is still raised. With the aid of a drive motor 515, barrier 513 may be moved or pivoted from the raised position into a lowered position in which barrier 513 would collide with motor vehicle 509 if motor vehicle 509 were to continue traveling to the end of ramp 507 and beyond.

A video camera 523 is situated on a post 525 in each case, at the start of ramp 507 on second floor 505, and in the immediate vicinity of ramp 507 on first floor 503. Video cameras 523 detect ramp 507, and may thus monitor travel of motor vehicle 509 on ramp 507. Based on the monitoring, it may be determined, for example, whether barrier 513 must be lowered or closed.

For this decision, for example a control device 519 is provided which is in communication connection with the two video cameras 523; i.e., a communication link is established between video cameras 523 and control device 519. The communication link is, for example, a wireless or wired communication link.

If control device 519 has decided, based on the monitoring data, that barrier 513 must be closed, it controls drive motor 515 in such a way that it closes barrier 513. Motor vehicle 509 will then collide with lowered barrier 513, as the result of which a speed of the motor vehicle is advantageously reduced while it is still on the ramp. The reduction includes in particular stopping or braking of motor vehicle 509 to a standstill. It is thus advantageously avoided that motor vehicle 509 collides, unbraked, with objects situated within first floor 503.

In addition, a communication interface 517 is provided which is configured for communicating via a wireless communication network. For example, communication interface 517 is configured for receiving an error message or an activation signal that has been emitted from motor vehicle 509 via a wireless communication network (a WLAN network and/or mobile communications network and/or LoRa communication network, for example). In response to the activation signal or the error message, for example barrier 513 is then closed. This means that, for example, the activation signal directly signals control device 519 that it is to control drive motor 515 in such a way that it lowers barrier 513.

For this purpose, it is provided, for example, that motor vehicle 509 includes a communication interface, not shown here, for communicating via a wireless communication network.

Thus, a device 521 for safeguarding a movement of a motor vehicle on an inclined ramp is provided, device 521 including barrier 513, drive motor 515, control device 519, and communication interface 517.

The present invention also encompasses in particular, among other things, the concept of providing an efficient technical concept that may efficiently safeguard travel or movement of a motor vehicle on an inclined ramp. As a result, in particular an error or a failure of the vehicle electrical system and/or the braking system of the motor vehicle does not result in or cause a collision with other objects, and in the event of a collision, the severity of an accident is reduced. The basic concept according to the present invention is to be seen in particular in that the motor vehicle is braked or even stopped by one or multiple collision object(s) while it is still on the ramp.

A collision object is, for example, a barrier that is moved into the travel path from the side, from above, or from below.

In another specific embodiment, a collision object is a pillar that is moved out of a floor into the travel path. In particular, multiple pillars are provided.

In one specific embodiment, a collision object is a safety net or a restraint cable.

In one specific embodiment, the collision object is configured in such a way that no damage to the motor vehicle results in the event of a collision. For example, the safety net or the restraint cable is made of an elastic material.

One criterion that the collision object(s) is/are to be moved into the travel path is satisfied in particular when it is determined that the motor vehicle is descending the ramp unbraked or is moving down the ramp unbraked. According to one specific embodiment, this recognition that the motor vehicle is descending the ramp unbraked is provided by the motor vehicle itself. According to this specific embodiment, the motor vehicle then directly transmits an activation signal for activating the movement device. This is still possible in particular when only a braking system has failed, whereas a vehicle electrical system, and in the present case a communication unit, continue to function.

According to one specific embodiment, it is provided that the motor vehicle transmits this finding, that the movement of the collision objects into the travel path is necessary, as an appropriate error message to the device for safeguarding a movement of a motor vehicle on an inclined ramp, via a communication network, so that the device then moves the collision objects into the travel path. According to one specific embodiment, the device is included in a parking facility management system. A parking facility management system controls or coordinates in particular operation of the parking facility.

According to one specific embodiment, the parking facility management system monitors or detects the situation, i.e., the travel of the motor vehicle on the ramp. This takes place in particular with the aid of a monitoring device, which may be included in a monitoring system, the parking facility management system activating the movement device in order to move the collision objects into the travel path.

According to one specific embodiment, this means that monitoring of the travel of the motor vehicle on the inclined ramp is provided externally to the motor vehicle, and based on the monitoring, it is decided whether one or multiple collision object(s) must be moved into the travel path.

According to one specific embodiment, the collision objects have already been moved into the travel path, i.e., are within the travel path, in particular as long as the motor vehicle is moving on the ramp. The collision objects are not moved out of the travel path until it is certain that either a failure of a braking system or of a vehicle electrical system may be ruled out, or that no further damage may result from such a failure. It may be determined that a failure of the braking system or of the vehicle electrical system may be ruled out in particular by checking whether the motor vehicle has stopped in front of the collision objects.

According to one specific embodiment, the device is appropriately configured for advertising or presentation purposes. This means, for example, that the device is provided with a company logo, for example. This means, for example, that the device is provided with a coat of paint of a specified color.

According to one specific embodiment, in each case multiple or all method steps are electronically stored or documented. This yields the technical advantage in particular that exactly what happened may be reconstructed, even at a subsequent point in time. The electronic storage and documentation are thus advantageously used for documentation purposes.

What is claimed is:

1. A method for safeguarding a movement of a motor vehicle on an inclined ramp in a parking facility, the method comprising:
   moving one or multiple collision objects, which are downhill from the motor vehicle, into a travel path specified by the ramp in the parking facility; and
   monitoring, via a monitoring device, a movement of the motor vehicle on the ramp, and wherein the one or multiple collision objects is moved into the travel path as a function of the monitoring, so that for a downhill movement of the motor vehicle on the travel path, a collision of the one or multiple collision objects with the motor vehicle reduces a speed of the motor vehicle while it is still on the ramp;
   wherein the collision objects are in a non-obstructive position when the collision objects are not required so that the motor vehicle can travel in a path of a respective one of the collision objects,
   wherein the monitoring device monitors at least an upper part of the ramp and a lower part of the ramp, wherein a control device is communicatively coupled via a communication link of a communication network to the monitoring device, and
   wherein a communication interface is coupled to the control device and is configured for receiving messages and/or signals from the motor vehicle, wherein the messages and/or signals are provided to the control device.

2. The method of claim 1, wherein the one or multiple collision objects includes one or multiple elements selected from the following group of collision objects: a barrier, a pillar, a safety net, and a restraint cable.

3. The method of claim 2, wherein the barrier is moved into the travel path from above, from below, or from the side.

4. The method of claim 2, wherein the pillar is moved out of a floor into the travel path.

5. The method of claim 1, wherein an activation signal, emitted from the motor vehicle, for activating a movement device for moving the one or multiple collision objects into the travel path of the motor vehicle is received via a communication network, the movement device being activated in response to the received activation signal in order to move the one or multiple collision objects is into the travel path.

6. The method of claim 1, wherein an error message emitted from the motor vehicle is received via a communication network, the one or multiple collision objects being moved into the travel path in response to the received error message.

7. The method of claim 1, wherein after the one or multiple collision objects moves into the travel path, the one or multiple collision objects are not moved once again out of the travel path to open up the travel path until a check has shown that an uncontrolled downhill movement of the motor vehicle on the travel path may be ruled out.

8. The method of claim 7, wherein the check includes making a check as to whether the motor vehicle is stopped in front of the one or multiple collision objects, an uncontrolled downhill movement of the motor vehicle being ruled out when the check has shown that the motor vehicle is stopped in front of the one or multiple collision objects.

9. A device for safeguarding a movement of a motor vehicle on an inclined ramp in a parking facility, comprising:
   a movement device to move one or multiple collision objects into a travel path specified by the ramp in the parking facility, downhill from the motor vehicle; and
   a monitoring device to monitor a movement of the motor vehicle on the ramp in the parking facility, wherein the movement device is configured for moving the one or multiple objects into the travel path as a function of the monitoring, so that for a downhill movement of the motor vehicle on the travel path, a collision of the one or multiple collision objects with the motor vehicle acts to reduce a speed of the motor vehicle while it is still on the ramp;
   wherein the collision objects are in a non-obstructive position when the collision objects are not required so that the motor vehicle can travel in a path of a respective one of the collision objects,
   wherein the monitoring device monitors at least an upper part of the ramp and a lower part of the ramp, wherein a control device is communicatively coupled via a communication link of a communication network to the monitoring device, and
   wherein a communication interface is coupled to the control device and is configured for receiving messages and/or signals from the motor vehicle, wherein the messages and/or signals are provided to the control device.

10. The device of claim 9, wherein the one or multiple collision objects includes one or multiple elements selected from the following group of collision objects: a barrier, a pillar, a safety net, and a restraint cable.

11. The device of claim 10, wherein the movement device is configured for moving the barrier into the travel path from above, from below, or from the side.

12. The device of claim 10, wherein the movement device is configured for moving the pillar out of a floor into the travel path.

13. The device of claim 9, further comprising:
   a communication interface to receive an activation signal, emitted from the motor vehicle, for activating the movement device for moving the one or multiple collision objects into the travel path of the motor vehicle, via a communication network, the movement device being configured for moving the one or multiple collision objects into the travel path in response to the received activation signal.

14. The device of claim 9, further comprising:
   a communication interface to receive an error message, emitted from the motor vehicle, via a communication network, the movement device being configured for moving the one or multiple collision objects into the travel path in response to the received error message.

15. The device of claim 9, further comprising:
   a checking device to check whether an uncontrolled downhill movement of the motor vehicle on the travel path may be ruled out, the movement device, after the movement of the one or multiple collision objects into the travel path, being configured for once again moving the one or multiple collision objects out of the travel path to open up the travel path only when the check has shown that an uncontrolled downhill movement of the motor vehicle on the travel path may be ruled out.

16. The device of claim 15, wherein the checking device is configured for checking whether the motor vehicle is stopped in front of the one or multiple collision objects, the checking device being configured for ruling out an uncontrolled downhill movement of the motor vehicle on the travel path when the check has shown that the motor vehicle is stopped in front of the one or multiple collision objects.

17. A parking facility, comprising:
   an inclined ramp; and
   a device for safeguarding a movement of a motor vehicle on an inclined ramp, including:
      a movement device to move one or multiple collision objects into a travel path specified by the ramp in a parking facility, downhill from the motor vehicle; and
      a monitoring device to monitor a movement of the motor vehicle on the ramp in the parking facility, wherein the movement device is configured for moving the one or multiple objects into the travel path as a function of the monitoring, so that for a downhill movement of the motor vehicle on the travel path, a collision of the one or multiple collision objects with the motor vehicle acts to reduce a speed of the motor vehicle while it is still on the ramp;
      wherein the collision objects are in a non-obstructive position when the collision objects are not required so that the motor vehicle can travel in a path of a respective one of the collision objects,
      wherein the monitoring device monitors at least an upper part of the ramp and a lower part of the ramp, wherein a control device is communicatively coupled via a communication link of a communication network to the monitoring device, and
      wherein a communication interface is coupled to the control device and is configured for receiving messages and/or signals from the motor vehicle, wherein the messages and/or signals are provided to the control device.

18. A non-transitory computer readable medium having a computer program, which is executable by a processor, comprising:
   a program code arrangement having program code for safeguarding a movement of a motor vehicle on an inclined ramp in a parking facility, by performing the following:
      moving one or multiple collision objects, which are downhill from the motor vehicle, into a travel path specified by the ramp in the parking facility; and
      monitoring, via a monitoring device, a movement of the motor vehicle on the ramp in the parking facility, wherein the one or multiple collision objects is moved into the travel path as a function of the monitoring, so that for a downhill movement of the motor vehicle on the travel path, a collision of the one or multiple collision objects with the motor vehicle acts to reduce a speed of the motor vehicle while it is still on the ramp;
      wherein the collision objects are in a non-obstructive position when the collision objects are not required so that the motor vehicle can travel in a path of a respective one of the collision objects,
      wherein the monitoring device monitors at least an upper part of the ramp and a lower part of the ramp, wherein a control device is communicatively coupled via a communication link of a communication network to the monitoring device, and
      wherein a communication interface is coupled to the control device and is configured for receiving messages and/or signals from the motor vehicle, wherein the messages and/or signals are provided to the control device.

* * * * *